US008676243B2

(12) United States Patent
Blanco

(10) Patent No.: US 8,676,243 B2
(45) Date of Patent: *Mar. 18, 2014

(54) METHOD AND APPARATUS FOR DUAL/MULTI-WATCH FOR GROUP PTT SERVICES

(75) Inventor: Alejandro G. Blanco, Davie, FL (US)

(73) Assignee: Motorola Solutions, Inc., Schaumburg, IL (US)

(*) Notice: Subject to any disclaimer, the term of this patent is extended or adjusted under 35 U.S.C. 154(b) by 989 days.

This patent is subject to a terminal disclaimer.

(21) Appl. No.: 12/327,584

(22) Filed: Dec. 3, 2008

(65) Prior Publication Data
US 2010/0137015 A1 Jun. 3, 2010

(51) Int. Cl.
H04B 7/00 (2006.01)

(52) U.S. Cl.
USPC ............................ 455/518; 455/517; 455/519

(58) Field of Classification Search
USPC ......................................... 455/517, 518, 519
See application file for complete search history.

(56) References Cited

U.S. PATENT DOCUMENTS

| | | | |
|---|---|---|---|
| 5,109,512 A | 4/1992 | Bahr et al. | |
| 5,231,699 A | 7/1993 | Tendler | |
| 7,190,969 B1* | 3/2007 | Oh et al. | 455/551 |
| 7,386,000 B2 | 6/2008 | Lopponen et al. | |
| 7,693,535 B2* | 4/2010 | Dunko | 455/518 |
| 7,933,623 B1 | 4/2011 | Vu | |
| 7,970,424 B2* | 6/2011 | Cai et al. | 455/518 |
| 8,036,693 B1* | 10/2011 | El-Fishawy | 455/518 |
| 8,230,466 B2 | 7/2012 | Cockrell et al. | |
| 8,307,388 B2 | 11/2012 | Igoe et al. | |
| 8,351,972 B1 | 1/2013 | Vu | |
| 8,380,160 B2 | 2/2013 | Monks et al. | |
| 2002/0077136 A1 | 6/2002 | Maggenti et al. | |
| 2003/0229900 A1 | 12/2003 | Reisman | |
| 2004/0031058 A1 | 2/2004 | Reisman | |
| 2005/0221877 A1 | 10/2005 | Davis et al. | |
| 2005/0288047 A1 | 12/2005 | Ananthanarayan et al. | |
| 2005/0288048 A1 | 12/2005 | Rosen et al. | |
| 2006/0030344 A1 | 2/2006 | Lim | |
| 2006/0142036 A1 | 6/2006 | Lim | |
| 2007/0021133 A1* | 1/2007 | Coulas | 455/518 |
| 2007/0049314 A1* | 3/2007 | Balachandran et al. | 455/518 |
| 2007/0136768 A1* | 6/2007 | Kumar | 725/81 |
| 2007/0140143 A1 | 6/2007 | Harris | |
| 2007/0197248 A1* | 8/2007 | Reich et al. | 455/518 |

(Continued)

FOREIGN PATENT DOCUMENTS

| | | |
|---|---|---|
| KR | 10-2007-0690752 B1 | 3/2007 |
| KR | 10-2008-0094824 A | 10/2008 |
| WO | 03096669 A2 | 11/2003 |

OTHER PUBLICATIONS

PCT International Search Report Dated Apr. 14, 2010.

(Continued)

Primary Examiner — Bobbak Safaipour
(74) Attorney, Agent, or Firm — Steven A. May

(57) ABSTRACT

A communication system (100) provides dual-watch and multi-watch capability for group PTT services. Incoming PTT calls are prioritized and played out in accordance with prioritized devices (130). A user of multiple communication devices can hear received audio traffic being played out in accordance with the priority assigned to the group call and the priority assigned to the communication device. Numerous calls can be simultaneously received and managed.

20 Claims, 2 Drawing Sheets

(56) References Cited

U.S. PATENT DOCUMENTS

| | | | |
|---|---|---|---|
| 2007/0202910 A1 | 8/2007 | Brewer et al. | |
| 2008/0139111 A1* | 6/2008 | Sheikha et al. | 455/3.04 |
| 2008/0168172 A1 | 7/2008 | Keller et al. | |
| 2008/0220765 A1 | 9/2008 | Chu et al. | |
| 2008/0232269 A1 | 9/2008 | Tatmman et al. | |
| 2008/0233990 A1 | 9/2008 | Jen | |
| 2009/0080353 A1 | 3/2009 | Zhang et al. | |
| 2009/0080362 A1 | 3/2009 | Song | |
| 2009/0131091 A1 | 5/2009 | Yang et al. | |
| 2009/0300357 A1* | 12/2009 | Kumar et al. | 713/171 |
| 2010/0016008 A1* | 1/2010 | Brewer et al. | 455/518 |
| 2010/0056194 A1* | 3/2010 | Sen et al. | 455/518 |
| 2010/0142414 A1 | 6/2010 | Patel et al. | |
| 2010/0214996 A1 | 8/2010 | Santhanam et al. | |
| 2010/0216502 A1 | 8/2010 | Hardin | |
| 2010/0248772 A1 | 9/2010 | Denman et al. | |
| 2010/0267411 A1 | 10/2010 | Allen | |
| 2011/0149767 A1* | 6/2011 | Lee et al. | 370/252 |
| 2011/0237217 A1 | 9/2011 | Monks et al. | |
| 2012/0117224 A1* | 5/2012 | Andrews et al. | 709/224 |
| 2012/0208588 A1* | 8/2012 | Blanco | 455/518 |
| 2012/0221644 A1* | 8/2012 | Karniely | 709/204 |
| 2013/0084912 A1* | 4/2013 | Lindner et al. | 455/518 |
| 2013/0172037 A1 | 7/2013 | Govind et al. | |
| 2013/0190033 A1* | 7/2013 | Aggarwal et al. | 455/518 |

OTHER PUBLICATIONS

English Translation of Office Action for Counterpart Korean Patent Application No. 10-2011-7015271 mailed on Aug. 14, 2012.

Non Final Office Action mailed on Oct. 5, 2012 in counterpart U.S. Appl. No. 113/453,507, filed Apr. 23, 2012.

International Preliminary Report on Patentability and Written Opinion for counterpart International Application No. PCT/US2009/057388 mailed on Jun. 16, 2011.

Final Office Action mailed on Apr. 15, 2013 in U.S. Appl. No. 13/453,507, Alejandro G Blanco, filed Apr. 23, 2012.

Patent Examination Report mailed Feb. 21, 2013 in Australian Patent Application No. 2009322928.

Office Action mailed Jul. 12, 2013 in Canadian Patent Application No. 2744529.

Office Action mailed Apr. 22, 2013 in Canadian Patent Appilication No. 2744529.

Supplementary European Search Report mailed Sep. 28. 2012 in European Patent Application No. 09830767.1.

Notice of Allowance mailed on Jul. 19, 2013 in U.S. Appl. No. 13/453,507; Alejandro G. Blanco, filed Apr. 23, 2012.

* cited by examiner

METHOD AND APPARATUS FOR DUAL/MULTI-WATCH FOR GROUP PTT SERVICES

FIELD OF THE INVENTION

The invention generally relates to communication systems and more particularly to managing calls across multiple push-to-talk (PTT) devices.

BACKGROUND OF THE INVENTION

Push-to-talk (PTT) is a two-way communication service that operates like a "walkie talkie." PTT is half-duplex, meaning communication can only travel in one direction at any given moment. By contrast, a typical cell phone call is full-duplex, meaning both parties can hear each other at the same time. There also exists communication devices that provide both full-duplex and half-duplex capabilities. PTT requires the person speaking to press a button on the communication device while talking and then release it when they are done. The listener then presses a PTT button on their own communication device to respond. Most PTT systems allow group calling, meaning one person can speak to everyone in their assigned or current group at once, just by pressing a PTT key. Some PTT systems use voice-over-IP (VoIP) technology to provide PTT service digitally over digital data networks. Public safety personnel, such as police officers, firefighters and rescue workers to name a few, utilize a variety of different communication devices in the field, including portable handheld radios, cell phones, mobile (vehicular) radios and accessories.

Public safety personnel often desire to listen to multiple PTT groups at one time. Typical solutions managing multiple PTT groups include scanning the groups listed in a scan list by various methods, then playing the audio when traffic is detected. Priorities are usually used in the scan list. Conventional scanning typically involves tuning to different radio frequency (RF) frequencies one by one and staying tuned to a frequency when activity is detected. Trunked scanning typically involves having an infrastructure entity report which groups have activity, with enough information to allow the radio to listen in on desired groups by tuning to a channel. However, both conventional scanning and trunked scanning are prone to missed calls, particularly when there is audio activity on two or more groups.

Accordingly, it would be desirable to improve call management in communication systems that utilize numerous communication devices.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
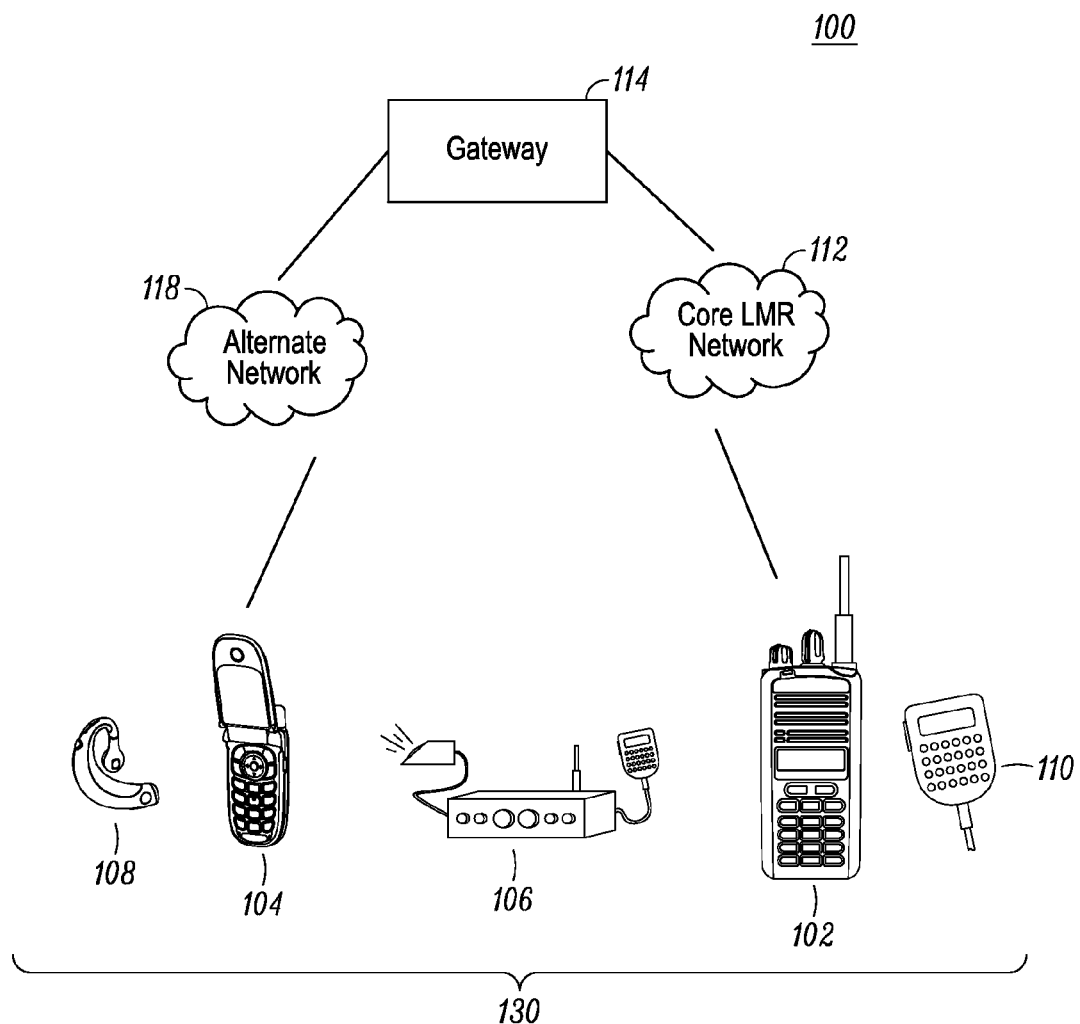
FIG. 1 is a block diagram of a communication system having multiple devices operating in accordance with various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in apparatus components and methods related to managing multiple calls across multiple devices via the use of dual watch or multi-watch.

Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

The call management technique and apparatus to be described herein is accomplished using dual watch or multi watch. Dual-watch is the ability to simultaneously listen to audio activity in two groups. Multi-watch is the ability to listen to two or more groups simultaneously. Dual-watch is accomplished by some public safety users by tuning multiple radios to different groups. These users are accustomed to listening to simultaneous call streams, typically occurring with a mobile (vehicle-based) radio and a portable (handheld) radio. It should be noted that although it is counter-intuitive, public safety users are accustomed to processing simultaneous audio streams and tuning into a desired audio stream, even in the presence of many other competing audio sources, including multiple radio transmissions. While prior approaches to dual watch have focused on multiple transceivers for call termination at a single device, the ability to manage multiple calls from multiple devices, such as calls coming in over different public safety broadcasts, would be highly beneficial. Briefly, in accordance with various embodiments of the invention to be described herein, a method and apparatus provide dual/multi-watch across multiple devices along with intelligent call management. Additionally, the use of a VoIP path for dual/multi-watch is provided.

Users working in the public safety environment commonly carry both a cellular phone and a two-way radio, which for the purposes of this application will be referred to as a phone and a radio, respectively. There are phones that support PTT calls and some that support group PTT calls over a cellular network. The PTT service is typically handled over an internet protocol (IP) stream, such as the Open Mobile Alliance push-to-talk over cellular (OMA PoC) standard. Such a service uses a software application that, for the purposes of this application, will referred to as a PTT-VoIP client.

The call management configuration operating in accordance with the various embodiments of the invention provides a way of accomplishing dual watch by receiving simultaneously on a radio and a phone. The configuration has an added feature of being able to receive more than two audio streams on the phone thereby enabling multi-watch. Referring to FIG. 1 there is shown a communication system 100, such as a public safety network, operating in accordance with the various embodiments of the invention. Communication system 100 includes a plurality of communication devices 130 under the control of a user. The plurality of communication devices and accessories 130 includes a radio 102, a phone 104, a mobile (in-vehicle) radio 106, an earpiece 108 and a remote speaker microphone (RSM) 110. The radio 102, the phone 104, the mobile radio 106, the audio earpiece 108, and the RSM 110 have speakers providing audio sinks over which the user hears audio. The speaker of radio 102 is a loud speaker and for the purposes of this application provides a preferred location for porting audio of a higher priority group, or porting a call a user is more actively involved in. The devices in 130 may be operably coupled over a personal area network (PAN) or other coupling means. Additional devices or fewer devices may also be used, but those shown illustrate a realistic example of the numerous devices a public safety officer may need to manage at any given time. A PTT-VoIP application resides in at least one of the devices to support PTT calls over an alternate network 118.

Communication system 100 is linked via a gateway component 114 which performs an application-layer conversion of information from one protocol stack to another, such as land mobile radio (LMR) network 112 to the alternate network 118 (and vice versa). The gateway component 114 includes LMR gateways. LMR gateways provide voice interoperability between radio and non-radio networks by bridging radio frequencies to IP streams, such as produced by alternate network 118. Examples of LMR networks are those that adhere to the APCO Project 25 standard and the Tetra standard. Examples of alternate networks are CDMA EVDO and GSM HSDPA cellular data/voice networks.

In accordance with various embodiments, the dual/multi-watch is managed with a coordinated approach between the devices 102, 104, 106, 108, and 110. The coordination can be implemented by a single PTT VoIP client in the radio 102 or phone 104 or mobile radio 106, or by multiple PTT VoIP clients in communication over a PAN. Regardless of the VoIP client location, the features of the call management operate as follows. The user of the plurality of devices 130 has a single list of groups they are interested in listening to, with preference rules describing the type of operation desired for each group. The list may have prioritization. The prioritization can be the traditional allocation of a first priority group, a second priority group, and the rest normal priority, or any other form of prioritizing between the groups the user wishes to configure. The prioritization may also be based on the type of incoming PTT call is being received, such as emergency given highest priority while non-emergency calls would be assigned lower priority. Another preference stored within the list may be the designation of a preferred audio device, which denotes which device is preferred for the highest priority audio. In most public safety applications, the highest priority audio would likely be defaulted to the radio 102. The selected default is based on historical data that has shown that users who carry a radio are most likely to have that device on their person than any other, and prefer PTT audio through that device. However, as user applications may vary, different devices could be selected as the default, or assigned different priorities, if desired.

In one embodiment, the highest priority active call traffic is played through the preferred audio device, and the next highest priority call audio is played through another device. As traffic starts and stops, audio may move to the second device if a higher priority group has activity, or the system may let that current transmission play out before moving subsequent transmissions to the second device since PTT transmissions tend to be very short (3-5 seconds). So for the case of the highest priority audio being assigned to the radio 102, two incoming calls would result in the highest priority call playing out the radio 102 and the next highest priority call playing out the phone 104. A third and fourth call coming in to the user of devices 130 could be played out at mobile radio 106 or earpiece 108, RMS 110 or other prioritized audio sinks.

The call management technique in accordance with various embodiments can also address mobility within the system. A distributed mobility approach is defined to choose between narrowband (NB) path between 112 and 114, and VoIP path between 114 and 118 for monitoring a group. The call management expands to allow for dual/multi-watch considerations, whereby a specific group can be monitored using the NB radio 102, and the other groups can be monitored via the VoIP path. It is likely, but not necessary, that the highest priority group would be the one assigned to the NB radio 102.

Among the considerations for where to place the PTT VoIP client, choosing to have the PTT VoIP client in the radio 102 and not in the phone 104 allows the radio 102 to use an off-the-shelf phone 104 using a standard modem profile from a PAN technology such as Bluetooth.

An alternative embodiment is to have the PTT VoIP client in the phone 104 and have the phone 104 forward audio over the PAN to the radio 102 thereby handling the call processing in the phone.

Additionally in yet another embodiment, the PTT VoIP client can exist in both the phone 104 and the radio 102. This embodiment allows redundancy because PTT-VoIP calls can be handled in either device.

Another aspect to the various embodiments of call management is the handling redundancy. If the devices loose PAN connectivity, or by manual setting or other means it is determined that the user wants to restrict operation to a single device, dual/multi-watch can be restricted to that device, to the degree that the single device is capable. If this single device mode happens and PAN connectivity is still there, the other device can still be used purely as a modem.

The call management technique operating within a communication system provides the advantage of spatial separation between audio sinks making multiple audio streams easier to understand. The call management technique is further advantageous in a mobile (vehicle) configuration where there is further spatial separation between the audio sinks. In addition to having spatial separation between audio sinks the call management technique may sum two or more call audio streams to a single audio sink when based on assigned device priority and call priority.

Figure 2:
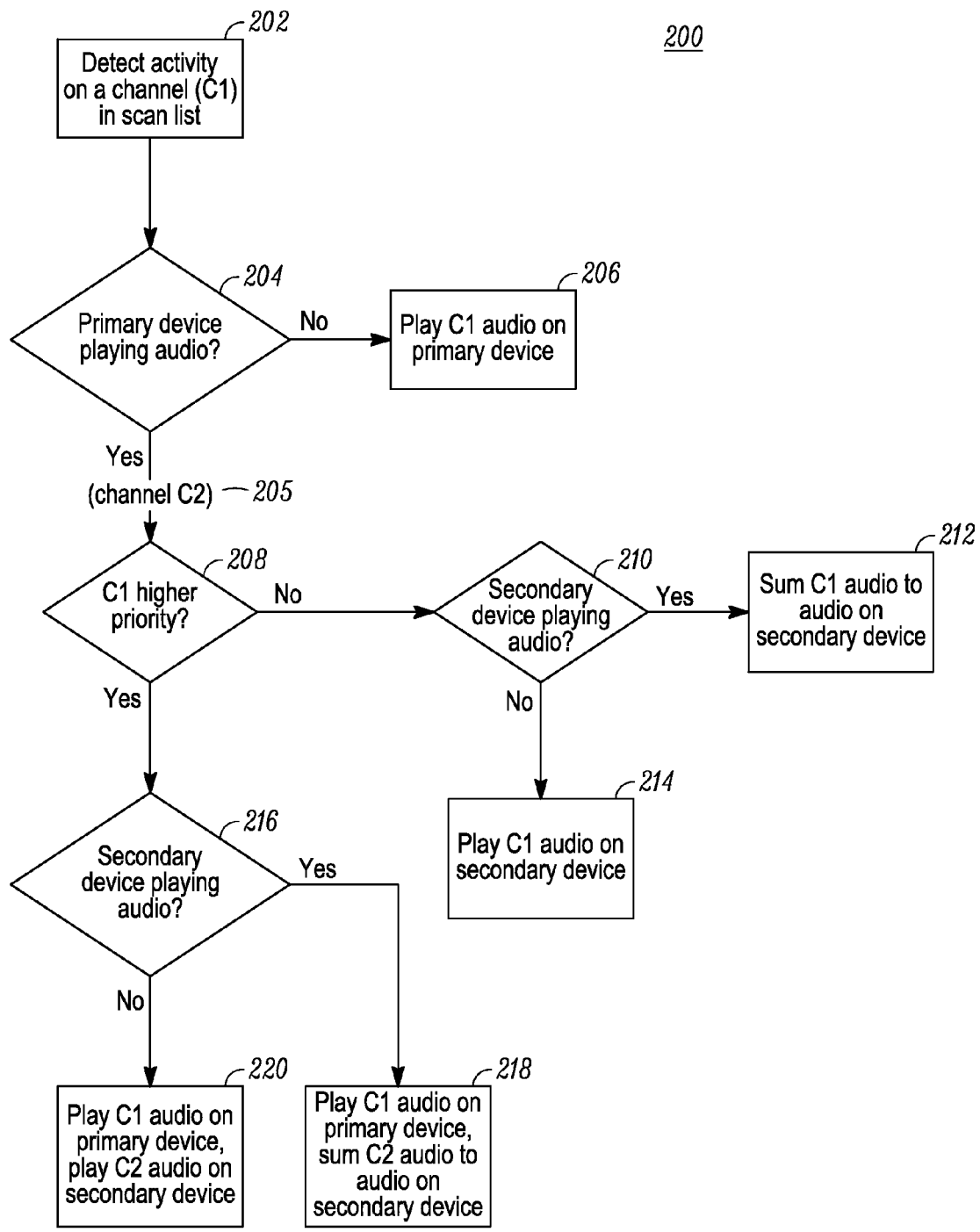
FIG. 2 is a flowchart of a method for managing multiple calls from multiple devices within a communication system in accordance with various embodiments of the invention.

Referring to FIG. 2, the call management technique 200 in accordance with various embodiments is shown. Step 202 begins by detecting audio activity on a channel (for example C1) from a scan list. As mentioned before the scan list is pre-stored and the types of incoming calls and groups are prioritized. A check is made at 204 to determine if the primary device is playing audio, if not then the audio traffic on channel C1 is played on the primary device at 206. If a determination is made at 204 that audio is being played on the primary device, then a determination is made at 205 as to which channel the audio originates from and then a priority check is made at 208. If channel C1 does not have a higher priority than channel C2 at 208, then a determination is made at 210 as to whether the secondary device is playing audio at 210. If the secondary device is playing audio at 210, then audio traffic from channel C1 goes to the secondary device at 214. If audio is already being played on the secondary device at 210, then the C1 audio is summed to the audio on the secondary device at 212.

If channel C1 does have higher priority than channel C2 back at 208, then a check is made to determine if audio is playing on the secondary device at 216. If the secondary device is not playing audio at 216, then channel C1 audio is played on the primary device and channel C2 audio is moved over to the secondary device at 220. If audio is played on the secondary device at 216, then channel C1 audio plays on the primary device, and the C2 audio is moved over to be summed with the current audio playing on the secondary device at 218. While described in terms of two devices, technique 200 is expandable to encompass as many prioritized devices as are in the communication system 100. Technique 200 may also vary based on device audio preferences, audio summing preferences, and allocation of a given group or priority to a device, as previously described.

In the embodiment just described the channels are assigned the priorities for scan. However, in an alternative embodiment the call priority can be based on the type of incoming PTT being received. For example, in APCO systems the calls have only one of two priorities (emergency or not), but in Tetra and OMA PoC systems, the calls have a numeric priority. The comparisons steps associated with flowchart 200 can be based on the priority of the type of call and be played out according to the prioritized devices. So for example, if preferred group call is played out over radio 102 while another group call is being played out over phone 104, and an emergency call comes in, then the emergency call, having the highest priority, would bump, the preferred group call over to the phone and the other group call would be bumped over to the mobile radio 106 or the earpiece 108 or the RSM 110 depending on how the devices were prioritized. Calls can also be summed to play out of the same device at different times as has also been described.

Accordingly, there has been provided a method and apparatus for managing calls across multiple devices. The call management technique is beneficial to government and public safety type operations where multiple calls may be coming in to a listener of multiple devices at the same time. Unlike the prior approaches to dual watch which have focused on multiple transceivers/speakers, each dedicated to a channel or group. The call management operating in accordance with the various embodiments provides dual/multi watch across multiple devices and manages them intelligently resulting in fewer missed calls, improved audio intelligibility, and device redundancy. The call management technique can also be readily adapted as different applications relating to priority arise.

Those skilled in the art will appreciate that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A communication system comprising;
   first and second communication devices that have speakers, one of the two devices being a push-to-talk (PTT) device, the first and second communication devices under the control of a single user and being operatively coupled over a personal area network (PAN);
   the first and second communication devices utilizing the PAN to provide a dual/multi-watch of incoming calls; and
   wherein one or more of the first and second communication devices implements a call management function that coordinates a simultaneous playing out, at different communication devices of the first and second communication devices, of audio traffic associated with different group calls based on a predetermined assigned priority between the first and second communication devices as well as a predetermined call priority.

2. The communication system of claim 1, wherein the call management function comprises a PTT voice over internet protocol (VoIP) client, wherein the first communication device is a radio and the second communication device is a phone, the radio having the PTT VoIP client running therein, the radio using the phone as a data modem and call processing being handled in the radio.

3. The communication system of claim 1, wherein the call management function comprises a PTT voice over internet protocol (VoIP) client, wherein one of the first communication device is a radio and the second communication device is a phone, the phone having the PTT VoIP client therein such that the phone forwards audio over a PAN link to the radio and call processing is handled in the phone.

4. The communication system of claim 1, wherein the call management function comprises a PTT voice over internet protocol (VoIP) client, wherein the first communication device is a radio and the second communication device is a phone, both the radio and the phone having the PTT VoIP client.

5. The communication system of claim 1, wherein the first device is designated as a priority device for playing out calls, wherein audio traffic playing on the first device is moved to the second device when a higher priority group call is determined to have activity, and wherein the first device then plays out audio traffic associated with the higher priority group call.

6. The communication system of claim 5, wherein the audio traffic starts and stops and the audio traffic is allowed to play through until it stops and is then moved to the second device.

7. The communication system of claim 1, wherein as audio traffic changes, a current transmission plays out on the first communication device before moving subsequent transmissions to the second communication device in response to a higher priority incoming call.

8. The communication system of claim 1, further comprising additional communication devices under the control of the single user, the additional communication devices providing audio sinks through which a plurality of audio streams are played out in accordance with the predetermined assigned priority and predetermined call priority.

9. The communication system of claim 1, wherein two or more call audio streams are summed to an audio sink.

10. The communication system of claim 1, further comprising additional communication devices used by the single user within a vehicle, the additional communication devices being prioritized for multi-watch over incoming calls, wherein a plurality of incoming calls are prioritized and played out over at least three of car speakers, land mobile radio speakers, portable radio speaker, phone speaker, and an audio earpiece.

11. A communication system comprising:
a plurality of audio communication devices under the control of a single user the plurality of communication devices utilizing a personal area network (PAN) for providing multi-watch for a plurality of incoming calls originating from a plurality of push-to-talk (PTT) sources, one of the plurality of communication devices coordinating play-out of the plurality of incoming calls on the plurality of audio communication devices based on a predetermined speaker priority assignment of the plurality of communication devices and a predetermined call priority.

12. The communication system of claim 11, wherein the communication device that determines the play-out of the plurality of incoming calls comprises a two-way radio.

13. The communication system of claim 12, wherein the two-way radio plays out the incoming calls on at least three of: the two-way radio itself, a cell phone, a mobile radio, an earpiece, and a remote speaker microphone.

14. The communication system of claim 12, wherein the two-way radio uses a stored scan list which contains priority assignments for the plurality of audio communication devices and the predetermined call priority.

15. The communication system of claim 11, wherein the predetermined call priority is based on channel origination of the plurality of incoming calls.

16. The communication system of claim 11, wherein the predetermined call priority is based on type of incoming call.

17. The communication system of claim 11, wherein the plurality of communication devices communicate with each other over a PAN network and at least one of the plurality of communication devices has a VoIP client.

18. The communication system of claim 11, wherein the plurality of audio communication devices are being operated within a vehicle.

19. The communication system of claim 11, wherein the plurality of audio communication devices include radio and non-radio devices.

20. The communication system of claim 11, wherein a first device of the plurality of communication devices is designated as a priority device for playing out calls, wherein audio traffic playing on the first device is moved to a second device of the plurality of communication devices when a higher priority group call is determined to have activity, and wherein the first device then plays out audio traffic associated with the higher priority group call.

\* \* \* \* \*